United States Patent
Yu et al.

(10) Patent No.: US 10,924,356 B2
(45) Date of Patent: Feb. 16, 2021

(54) NETWORK SERVICE SCHEDULING METHOD AND APPARATUS, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Zijun Yu, Shenzhen (CN); Xianbin Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 210 days.

(21) Appl. No.: 16/014,954

(22) Filed: Jun. 21, 2018

(65) Prior Publication Data
US 2018/0302296 A1 Oct. 18, 2018

Related U.S. Application Data

(63) Continuation of application No. PCT/CN2017/094907, filed on Jul. 28, 2017.

(30) Foreign Application Priority Data
Oct. 14, 2016 (CN) .......................... 201610900036.4

(51) Int. Cl.
G06F 15/173 (2006.01)
H04L 12/24 (2006.01)
H04L 12/26 (2006.01)

(52) U.S. Cl.
CPC ........ H04L 41/147 (2013.01); H04L 41/0896 (2013.01); H04L 41/16 (2013.01);
(Continued)

(58) Field of Classification Search
CPC ..................................................... H04L 41/147
(Continued)

(56) References Cited

U.S. PATENT DOCUMENTS 8,849,942 B1 * 9/2014 Foster .................. G09B 29/106
709/213
9,384,297 B2 * 7/2016 Graham ................ G06F 16/957
(Continued)

FOREIGN PATENT DOCUMENTS

CN 101695050 4/2010
CN 102609360 7/2012
(Continued)

OTHER PUBLICATIONS

International Search Report dated Nov. 3, 2017 in PCT/CN2017/094907 filed Jul. 28, 2017. (With English Translation).
(Continued)

*Primary Examiner* — Anthony Mejia
(74) *Attorney, Agent, or Firm* — Oblon, McClelland, Maier & Neustadt, L.L.P.

(57) ABSTRACT

Aspects of the disclosure provide a method and an apparatus for network service scheduling. The apparatus includes interface circuitry and processing circuitry. The interface circuitry receives network traffic data from devices in a content delivery network (CDN) that provides network services. The processing circuitry obtains historical network traffic data of the network services. The historical network traffic data includes network traffic measures of the network services in past time units from a present moment. The processing circuitry predicts future network traffic of the network services in a next time unit after the present moment according to the historical network traffic data of the network services. Then the processing circuitry schedules net-
(Continued)

work resources for the network services according to the predicted future network traffic.

20 Claims, 4 Drawing Sheets (52) U.S. Cl.
CPC ........ *H04L 41/5022* (2013.01); *H04L 43/067* (2013.01); *H04L 43/0876* (2013.01); *H04L 43/16* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 9,626,363 | B2* | 4/2017 | Rosenblatt | G06F 16/40 |
| 9,826,057 | B2* | 11/2017 | Agarwal | G06F 16/9535 |
| 10,091,322 | B2* | 10/2018 | O'Donoghue | G06F 9/4451 |
| 2003/0114138 | A1* | 6/2003 | Ramaswamy | H04L 67/2842 |
| | | | | 455/403 |
| 2003/0135631 | A1* | 7/2003 | Li | H04L 29/06027 |
| | | | | 709/231 |
| 2004/0034712 | A1* | 2/2004 | Rajwan | H04L 1/0083 |
| | | | | 709/231 |
| 2006/0075019 | A1* | 4/2006 | Donovan | H04L 67/306 |
| | | | | 709/203 |
| 2008/0046584 | A1* | 2/2008 | Tucker | H04N 7/163 |
| | | | | 709/231 |
| 2008/0084896 | A1* | 4/2008 | Fleury | H04L 65/4084 |
| | | | | 370/468 |
| 2008/0177994 | A1* | 7/2008 | Mayer | G06F 9/4418 |
| | | | | 713/2 |
| 2008/0242280 | A1* | 10/2008 | Shapiro | H04N 21/41407 |
| | | | | 455/414.3 |
| 2009/0281718 | A1* | 11/2009 | Gibran | G01C 21/32 |
| | | | | 701/532 |
| 2009/0307368 | A1* | 12/2009 | Sriram | H04N 21/44004 |
| | | | | 709/231 |
| 2010/0205628 | A1* | 8/2010 | Davis | H04N 21/482 |
| | | | | 725/25 |
| 2011/0314145 | A1* | 12/2011 | Raleigh | H04L 47/12 |
| | | | | 709/224 |
| 2012/0289147 | A1* | 11/2012 | Raleigh | H04N 21/6547 |
| | | | | 455/3.06 |
| 2012/0302218 | A1* | 11/2012 | Tsuda | H04W 8/18 |
| | | | | 455/414.1 |
| 2012/0320916 | A1* | 12/2012 | Sebastian | H04N 21/6375 |
| | | | | 370/390 |
| 2013/0097309 | A1* | 4/2013 | Ma | H04L 67/2847 |
| | | | | 709/224 |
| 2013/0163667 | A1* | 6/2013 | Nilsson | H04N 21/44004 |
| | | | | 375/240.12 |
| 2013/0275685 | A1* | 10/2013 | Barbas | G06F 16/24552 |
| | | | | 711/137 |
| 2013/0282890 | A1* | 10/2013 | Ma | G06F 16/24568 |
| | | | | 709/224 |
| 2013/0332297 | A1* | 12/2013 | Forutanpour | G01C 21/3461 |
| | | | | 705/26.1 |
| 2014/0067257 | A1* | 3/2014 | Dave | H04W 4/40 |
| | | | | 701/423 |
| 2015/0006731 | A1* | 1/2015 | Ren | H04L 47/826 |
| | | | | 709/226 |
| 2015/0113156 | A1* | 4/2015 | Smith | H04L 65/605 |
| | | | | 709/231 |
| 2015/0120876 | A1* | 4/2015 | Parthasarathy | H04L 65/60 |
| | | | | 709/219 |
| 2015/0326481 | A1 | 11/2015 | Rector | |
| 2020/0014486 | A1* | 1/2020 | Harrang | H04L 47/25 |

FOREIGN PATENT DOCUMENTS

| | | |
|---|---|---|
| CN | 102622185 | 8/2012 |
| CN | 102857470 A | 1/2013 |
| CN | 103595656 A | 2/2014 |
| CN | 103685072 A | 3/2014 |
| CN | 104182184 | 12/2014 |
| CN | 104270402 | 1/2015 |
| CN | 105306539 | 2/2016 |
| CN | 105578579 A | 5/2016 |
| CN | 105654729 A | 6/2016 |

OTHER PUBLICATIONS

Written Opinion of The International Searching Authority dated Nov. 3, 2017 in PCT/CN2017/094907 filed Jul. 28, 2017. (with English Translation).
Combined Office Action and Search Report dated Apr. 15, 2019 in Chinese Patent Application No. 201610809970.5 (with Concise English language translation).
Office Action dated Aug. 23, 2020 issued in corresponding Chinese patent application No. 201610900036.4 (with partial translation).

* cited by examiner

NETWORK SERVICE SCHEDULING METHOD AND APPARATUS, STORAGE MEDIUM, AND PROGRAM PRODUCT

RELATED APPLICATION

This application is a continuation of International Application No. PCT/CN2017/094907, filed on Jul. 28, 2017, which claims priority to Chinese Patent Application No. 201610900036.4, entitled "NETWORK SERVICE SCHEDULING METHOD AND APPARATUS" filed with the Chinese Patent Office on Oct. 14, 2016. The entire disclosures of the prior applications are incorporated by reference herein in their entirety.

FIELD OF THE TECHNOLOGY

This application relates to the field of Internet technologies.

BACKGROUND OF THE DISCLOSURE

With the increase of newly emerged media such as audio and video in the Internet, traffic carried by a content delivery network (CDN) has doubled and redoubled, so that how to perform bandwidth scheduling to a network service in the CDN gradually becomes a problem urgently to be resolved by a CDN vendor.

In related technologies, a bandwidth is allocated to each network service according to priority of the network service in a CDN, that is, priority of each network service is determined according to sensitivity of the network service to a bandwidth and a bandwidth is first guaranteed to a network service with relatively high priority. For example, a streaming media service has relatively high sensitivity to a bandwidth and a downloading service has relatively low sensitivity to a bandwidth. Therefore, priority of the streaming media service is higher than priority of the downloading service. When performing bandwidth scheduling, a system may first allocate a relatively high bandwidth to the streaming media service and allocate a relatively low bandwidth to the downloading service.

SUMMARY

In the related technologies, because a bandwidth is allocated according to priority of a network service, a bandwidth allocated to a service with high priority may be surplus and a bandwidth allocated to a service with low priority may be insufficient. Consequently, the bandwidth scheduling of the network services is inaccurate and has a poor scheduling effect, leading to improper use of the bandwidths.

To resolve the problem that a bandwidth allocated to a service with high priority may be surplus and a bandwidth allocated to a service with low priority may be insufficient in the related technologies due to that a bandwidth is allocated according to priority of a network service, embodiments of this application provide a network service scheduling method and apparatus, a storage medium, and a program product.

Aspects of the disclosure provide a method and an apparatus for network service scheduling. The apparatus includes interface circuitry and processing circuitry. The interface circuitry receives network traffic data from devices in a content delivery network (CDN) that provides network services. The processing circuitry obtains historical network traffic data of the network services. The historical network traffic data includes network traffic measures of the network services in past time units from a present moment. The processing circuitry predicts future network traffic of the network services in a next time unit after the present moment according to the historical network traffic data of the network services. Then the processing circuitry schedules network resources for the network services according to the predicted future network traffic.

In some embodiment, the processing circuitry obtains, for a network service, first feature data of the next time unit according to the historical network traffic data of the network service. Then, the processing circuitry predicts the future network traffic of the network service according to the first feature data of the next time unit and a machine learning model with a model parameter.

In an example, the processing circuitry obtains a time index of the next time unit that is indicative of a specific time duration in a day corresponding to the next time unit. The first feature data of the next time unit for the network service includes the time index.

In another example, the processing circuitry obtains a day index of the next time unit that is indicative of a specific day in a week for the next time unit. The first feature data of the next time unit for the network service includes the day index.

In another example, the processing circuitry obtains X network traffic measures of the network service respectively in latest X time units. X is a positive integer, and the first feature data of the next time unit for the network service includes the X network traffic measures.

In another example, the processing circuitry obtains Y network traffic measures of the network service respectively for latest Y days. Y is a positive integer. A network traffic measure in the Y network traffic measures for a day in the latest Y days is a traffic measure of the network service in a specific time unit of the day. The specific time unit of the day has the same time index as the next time unit. The first feature data of the next time unit for the network service includes the Y network traffic measures.

In another example, the processing circuitry obtains Z network traffic measures of the network service respectively for latest Z weeks. Z is a positive integer. A network traffic measure in the Z network traffic measures for a week is a traffic measure of the network service in a specific time unit in the week. The specific time unit in the week has the same time index and the same day index as the next time unit. The first feature data of the next time unit for the network service includes the Z network traffic measures.

In another example, the processing circuitry determines an activeness of the network service. The first feature data of the next time unit for the network service includes the activeness of the network service.

In an embodiment, the processing circuitry obtains multiple groups of training data of the network service according to the historical network traffic data of the network service. A group of training data in the multiple groups of training data includes a network traffic measure of the network service in a past time unit and second feature data of the past time unit. Then, the processing circuitry trains the machine learning model according to the multiple groups of training data of the network service, to determine the model parameter.

In an example, the processing circuitry obtains correction data of the network service after the next time unit and a network traffic measure of the network service in the next time unit is available. The correction data includes the network traffic measure in the next time unit and the first feature data of the next time unit. Then, the processing circuitry corrects the model parameter of the machine learning model according to the correction data.

In an embodiment, the processing circuitry schedules network bandwidths respectively to the network services in the next time unit according to the predicted future network traffic of the network services.

Aspects of the disclosure also provide a non-transitory computer-readable medium storing instructions to cause a computer to perform the method for network service scheduling.

The technical solutions provided in the embodiments of this application may include the following beneficial effects. In some embodiments, the method includes obtaining historical traffic data of network services, the historical traffic data including actual traffic of a corresponding network service in each historical unit time period; predicting predicted traffic of the network services in a next unit time period after a current moment according to the historical traffic data of the network services; and performing service scheduling for the network services according to the predicted traffic, that is, predicting the predicted traffic in the next unit time period of the network service according to the actual traffic in each historical unit time period of the network service. Scheduling is performed to the network service according to the predicted traffic, so that when the scheduling is performed to the network service, service scheduling can be pre-performed to to-be-generated traffic in the next unit time period based on the network service, thereby accurately scheduling the network service and improving a scheduling effect of the network service.

It should be understood that the foregoing general descriptions and the following detailed descriptions are merely exemplary and explanatory, and this application is not limited thereto.

BRIEF DESCRIPTION OF THE DRAWINGS

The accompanying drawings herein form a part of the specification, illustrate embodiments consistent with this application and are used to explain the principles of this application together with the specification.

DESCRIPTION OF EMBODIMENTS

Exemplary embodiments are described in detail herein, and examples of the exemplary embodiments are shown in the accompanying drawings. When the following descriptions are performed with reference to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

Figure 1:
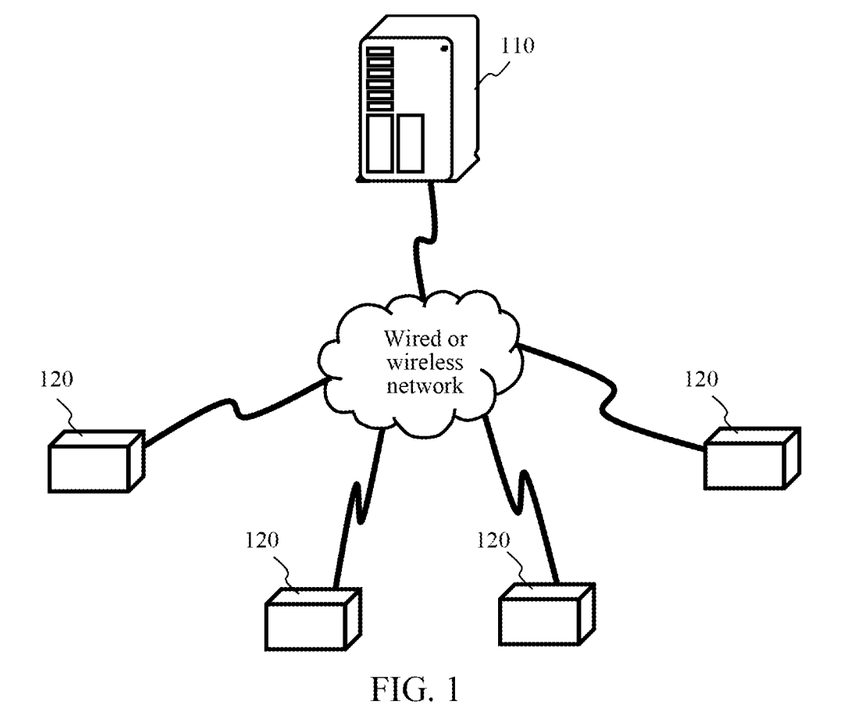
FIG. 1 is a schematic structural diagram of a network environment according to this application.

FIG. 1 is a schematic structural diagram of a network environment according to this application. The network environment includes the following network devices: a server 110 and at least one network service node 120.

The server 110 may be a single server, or may be a server cluster composed of a plurality of servers, or may be a cloud computing center.

The network service node 120 provides service support for at least one network service.

The server 110 may be a server in a scheduling system. The scheduling system is used to perform service scheduling to a network service corresponding to each network service node 120, for example, perform bandwidth allocation.

As shown in FIG. 1, the server 110 may be deployed independent of each network service node 120. Alternatively, the server 110 may be deployed on a network service node 120. Alternatively, the server 110 may be deployed on each network service node 120 in a distributed manner.

Figure 2:
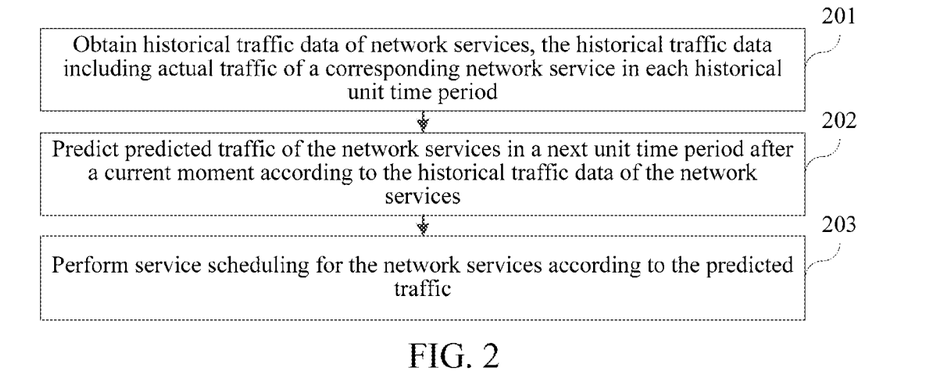
FIG. 2 is a flowchart of a network service scheduling method according to an exemplary embodiment.

FIG. 2 is a flowchart of a network service scheduling method according to an exemplary embodiment. The method may be used in the server shown in FIG. 1 to perform management scheduling on each network service managed by the server. As shown in FIG. 2, the network service scheduling method may include the following steps:

Step 201: Obtain historical traffic data of network services, the historical traffic data including actual traffic of a corresponding network service in each historical unit time period.

Step 202: Predict predicted traffic of the network services in a next unit time period after a current moment according to the historical traffic data of the network services.

Step 203: Perform service scheduling for the network services according to the predicted traffic.

Based on the above, the network service scheduling method provided in this embodiment of this application includes: obtaining historical traffic data of network services, the historical traffic data including actual traffic of a corresponding network service in each historical unit time period; predicting predicted traffic of the network services in a next unit time period after a current moment according to the historical traffic data of the network services; and performing service scheduling for the network services according to the predicted traffic, that is, predicting the predicted traffic in the next unit time period of the network service according to the actual traffic in each historical unit time period of the network service. Scheduling is performed to the network service according to the predicted traffic, so that when the scheduling is performed to the network service, service scheduling can be pre-performed to to-be-generated traffic in the next unit time period based on the network service, thereby accurately scheduling the network service and improving a scheduling effect of the network service.

In a possible application scenario in this application, the network service node 120 in FIG. 1 may be a network node in a CDN. For example, the network service node 120 may be a content source node, a cache node distributed on an edge of the network, a content exchange node, and the like. The content source node is responsible for generating service content of a network service, the cache node is responsible for caching all or part of the service content generated by the content source node, and the content exchange node is responsible for performing load balance between each cache node. Each network service node 120 provides service support for each network service in the CDN, for example, a streaming media service or a downloading service. The server 110 is all or some servers in a scheduling system of the CDN. The server 110 is connected to each network service node 120 and is configured to perform bandwidth scheduling for each network service supported by the network service node 120, that is, to allocate a bandwidth to each network service. The following embodiments of this application are described in detail by using this scenario as an example.

Figure 3:
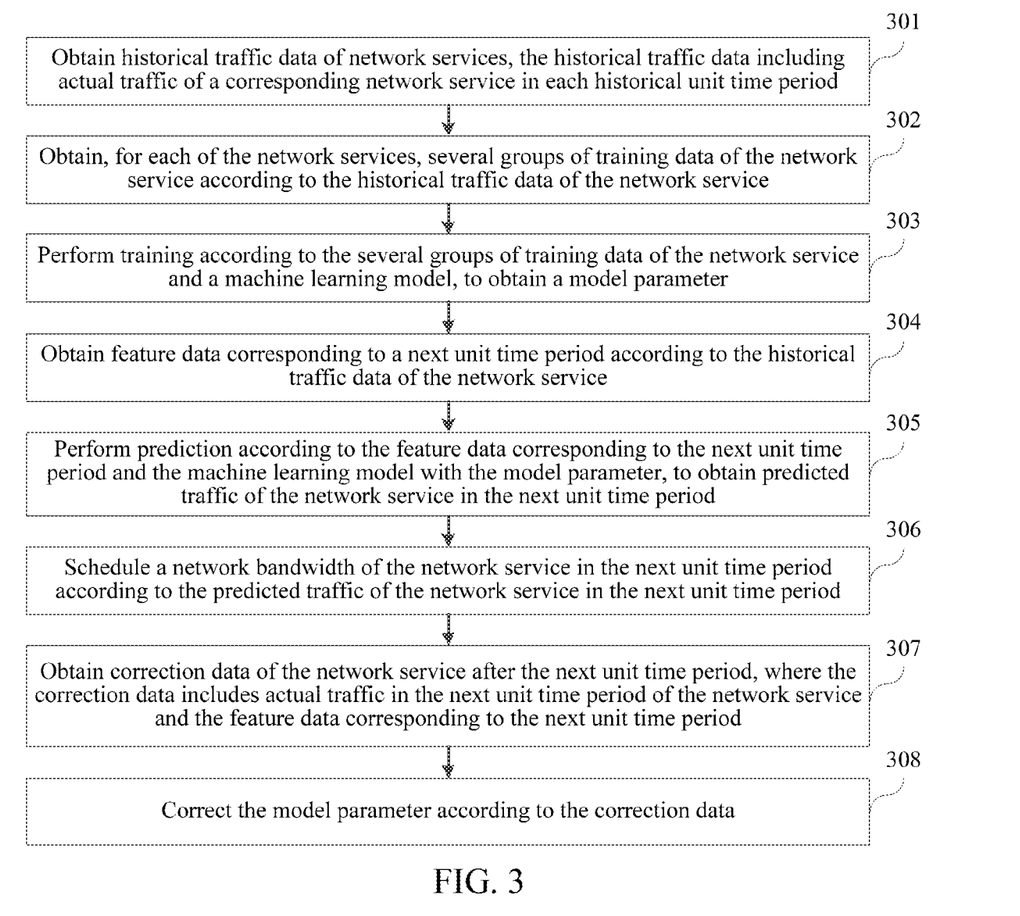
FIG. 3 is a flowchart of a network service scheduling method according to another exemplary embodiment.

FIG. 3 is a flowchart of a network service scheduling method according to another exemplary embodiment. The method may be used in the server shown in FIG. 1 to perform management scheduling on each network service managed by the server. Using that the server may be a server in a scheduling system of a CDN and is configured to perform bandwidth scheduling for each network service in the CDN as an example, as shown in FIG. 3, the network service scheduling method may include the following steps:

Step 301: Obtain historical traffic data of network services, the historical traffic data including actual traffic of a corresponding network service in each historical unit time period.

In this embodiment of this application, traffic of each network service may be counted according to a unit time period. The unit time period may be set according to actual scheduling needs. For example, the unit time period may be set to one hour, a quarter, one minute, and the like.

Specifically, use that one minute is a unit time period as an example. The system can pre-divide one day into 1440 unit time periods and every two adjacent unit time periods are connected, that is, an ending moment of a former unit time period is a starting moment of a latter unit time period. When counting the historical traffic data of each network service, the server may count and store traffic in every minute of the network service. When obtaining the historical traffic data, the server directly reads the stored historical traffic data of the network service.

Considering timeliness of data, in this embodiment of this application, historical traffic data of the network service in the latest time period may be obtained, for example, historical traffic data of each network service in the last three months may be obtained.

Step 302: Obtain, for each of the network services, several groups of training data of the network service according to the historical traffic data of the network service.

Each group of the training data includes actual traffic of the network service in a historical unit time period and feature data corresponding to the historical unit time period.

In this embodiment of this application, when the server predicts traffic in a next unit time period, independent prediction may be performed for the network services, that is, step 302 and the subsequent steps are performed by using a single network service as an object.

Specifically, each of the network services corresponds to a region, an operator, and a service type. That is, in this embodiment of this application, the network services are divided according to regions, operators, and service types. For example, it is assumed that there are two types of network services in the CDN: a streaming media service and a downloading service, Jiangsu-Telecom-live broadcast is a network service 1, Jiangsu-Telecom-downloading is a network service 2, Jiangsu-Mobile-live broadcast is a network service 3, Jiangsu-Mobile-downloading is a network service 4, . . . , Hubei-Telecom-live broadcast is a network service N, Hubei-Telecom-downloading is a network service N+1, Hubei-Mobile-live broadcast is a network service N+2, Hubei-Mobile-downloading is a network service N+3, . . . .

The service corresponding to each region and each operator is an independent network service.

When obtaining training data of a network service, the server may obtain feature data according to actual traffic in each unit time period of the network service in the obtained historical traffic data. For a historical unit time period a in the network service, feature data in the historical unit time period a includes at least one of the following features:

Feature 1: A time period index of the historical unit time period a, the time period index being used for indicating that a corresponding unit time period is which unit time period in a day.

For example, use that one minute is a unit time period as an example. One day includes 24 hours, that is, 1440 minutes, so that the day is divided into 1440 unit time periods. Index numbers start from the first minute (00:00:00-00:01:00) of the morning. A first one minute index is 0, a second one minute index is 1, and so on. A last one minute (23:59:00-00:00:00) index is 1439. That is, a value range of the time period index of the historical unit time period a is [0,1439].

Feature 2: A day index of the historical unit time period a, the day index being used for indicating that a current day of the corresponding unit time period is which day in a week.

One week includes 7 days, so that a value range of the day index of the historical unit time period a is [0,6], that is, when a current day of the historical unit time period a is Monday, the day index of the historical unit time period a is 0, when a current day of the historical unit time period a is Tuesday, the day index of the historical unit time period a is 1, and so on.

Feature 3-feature X+2: Corresponding traffic of the network service respectively in latest X unit time periods before the historical unit time period a.

Actual traffic in a unit time period of the network service usually relates to a trend of actual traffic in latest several unit time periods before the unit time period. Therefore, in this embodiment of this application, the corresponding traffic of the network service respectively in latest X unit time periods before the historical unit time period a is obtained as feature data in the historical unit time period a corresponding to the network service.

X is a preset positive integer. For example, it is assumed that X is 20, the feature 3-feature 22 are respectively corresponding traffic of the network service respectively in each of historical unit time period a-1 to historical unit time period a-20.

Feature X+3-feature X+Y+2: Actual traffic of the network service in each unit time period corresponding to the time period index of the historical unit time period a in Y days before the current day.

Traffic corresponding to the network service usually has periodicity, that is, actual traffic in a unit time period in a current day usually relates to actual traffic in a same unit time period corresponding to previous days. Therefore, in an exemplary embodiment of this application, for the historical unit of time segment a, actual traffic in a historical unit time period that is in each of first six days (where Y is 6) and that has a same time period index as a time period index of the historical unit time period a may be selected and recorded as feature 23-feature 28. Y is a preset positive integer.

Specifically, for example, use that one minute is a unit time period as an example. In one week, it is assumed that the time period index of the historical unit time period a is 1 and the current day is Saturday, feature 23 is traffic in one minute (that is, the second minute in Friday) whose time period index is 1 in Friday in the week. Similarly, feature 24 is traffic in one minute (that is, the second minute in Thursday) whose time period index is 1 in Thursday in the week. Similarly, feature 28 is traffic in one minute (that is, the second minute in Sunday) whose time period index is 1 in Sunday in the week.

Feature X+Y+3-feature X+Y+Z+2: Actual traffic of the network service in each unit time period corresponding to the time period index and day index of the historical unit time period a in Z weeks before the current day.

Similar to feature X+3-feature X+Y+2, actual traffic in a unit time period of a day in a week relates to actual traffic in a same unit time period of a same day in another week. Therefore, in an exemplary embodiment of this application, for the historical unit of time segment a, actual traffic in a historical unit time period that is in each of first four weeks (where Z is 4) and that has a same time period index and day index as a time period index and day index of the historical unit time period a may be selected and recorded as feature 29-feature 32. Z is a preset positive integer.

Specifically, for example, use that one minute is a unit time period as an example. It is assumed that the time period index of the historical unit time period a is 1 and the current day is Saturday, feature 29 is traffic in one minute (that is, the second minute) whose time period index is 1 in last Saturday, feature 30 is traffic in one minute whose time period index is 1 in Saturday before last Saturday.

Feature X+Y+Z+3: Activeness of the network service in the historical unit time period a.

In this embodiment of this application, the activeness of the network service in the historical unit time period a may be determined by a maximum value and a minimum value of actual traffic in the historical unit time period respectively corresponding to each of several groups of training data of the network device and the traffic in the historical unit time period a. Specifically, the maximum value of the actual traffic in the historical unit time period respectively corresponding to each of the several groups of training data of the network device is recorded as 1, and the minimum value is recorded as 0. Interpolation is performed between 0 to 1 according to a relationship between the actual traffic in the historical unit time period a and the maximum value and the minimum value of the actual traffic in the historical unit time period respectively corresponding to each group of training data, obtain the activeness of the network service in the historical unit time period a, that is, a value range of the activeness of the network service in the historical unit time period a is [0, 1].

The foregoing embodiment of this application uses the foregoing 33 types of features as an example for description. During actual application, a type and a quantity of the features can be flexibly adjusted according to actual use requirements, which is not limited in this embodiment of this application.

In the foregoing manner, a server can obtain a plurality of groups of different training data to perform the subsequent training.

Step 303: Perform training according to the several groups of training data of the network service and a machine learning model, to obtain a corresponding model parameter.

In this embodiment of this application, the model parameter is used to drive the machine learning model to perform machine learning, so as to output a prediction result of a next preset time period. Before that, a proper model parameter needs to be determined first, so as to ensure accuracy of the following prediction result. In this step, the determined several groups of training data in step 302 may be used to train the machine learning model, to obtain the model parameter.

In this embodiment of this application, a neural network model may be used as the machine learning model. Specifically, step of performing training to the machine learning model according to the several groups of training data, to obtain the model parameter may include: for each of the network services, the obtained several groups of training data of the network service in step 302 may be input into the neural network model, and for each group of training data, actual traffic in a historical unit time period in the data is output, feature data corresponding to the historical unit time period in the data is input, and a learning algorithm of a neural network is used to calculate a neural network model parameter used for predicting traffic.

It is noted that for ease of model training, before each group of training data inputs the neural network model, normalization processing needs to be performed.

For example, use that one minute is a unit time period, and X, Y, and Z are respectively 20, 6, and 4 as an example. Feature 1 is made to divide 1439, that is, normalized as a floating point [0, 1]. Feature 2 is made to divide 6, that is, also normalized as a floating point [0, 1]. For feature 3 to feature 32, in each group of training data, a minimum value of the actual traffic in the historical unit time period is $y_{min}$ and a maximum value is $y_{max}$. A value of feature 3 to feature 32 is (feature $x-y_{min}$)/($y_{max}-Y_{min}$), and a value range of x is [3, 32], that is, feature 3 to feature 32 are respectively normalized as a floating point [0, 1]. Feature 33 is normalized itself and does not need extra processing.

Step 304: Obtain feature data corresponding to a next unit time period according to the historical traffic data of the network service.

The feature data corresponding to the next unit time period includes at least one type of the following data:

a time period index of the next unit time period, the time period index being used for indicating that a corresponding unit time period is which unit time period in a day;

a day index of the next unit time period, the day index being used for indicating that a current day of the corresponding unit time period is which day in a week;

corresponding traffic of the network service respectively in X unit time periods latest to the current moment;

actual traffic of the network service in each unit time period corresponding to the time period index of the next unit time period in Y days before the current day;

actual traffic of the network service in each unit time period corresponding to the time period index and the day index of the next unit time period in Z weeks before the current day; and activeness of the network service in the next unit time period.

An obtaining manner of the feature data corresponding to the next unit time period is similar to an obtaining manner of the feature data in each group of training data in the foregoing training data, which is not described herein. Different from step 302, in step 304, the server does not know the actual traffic of the network service in the next unit time period because the next unit time period has not come yet. Therefore, the activeness of the network service in the next unit time period may be preset, for example, be manually set by a manager by using a setting interface of the server.

Step 305: Perform prediction according to the feature data corresponding to the next unit time period and the machine learning model with the model parameter, to obtain predicted traffic of the network service in the next unit time period.

The server may perform prediction according to the feature data corresponding to the next unit time period and the trained machine learning model in step 203, to obtain the predicted traffic of the network service in the next unit time period.

Use that a neural network model is used as the machine learning model as an example. After the neural network model determines the model parameter by training in step 303, when the predicted traffic of the network service in the next unit time period is predicted, in an example, the feature data of the network service corresponding to the next unit time period is input into the neural network model, so that the neural network model can output the predicted traffic.

Step 306: Schedule a network bandwidth of the network service in the next unit time period according to the predicted traffic of the network service in the next unit time period.

When the server performs scheduling to the network bandwidth of the network service, an effect of a bandwidth of other network services may be comprehensively considered, that is, the server can schedule the network bandwidth of each network service correspondingly in the next unit time period according to the predicted traffic of the network services.

Step 307: Obtain correction data of the network service after the next unit time period, where the correction data includes actual traffic in the next unit time period of the network service and the feature data corresponding to the next unit time period.

Step 308: Correct the model parameter according to the correction data.

In this embodiment of this application, after the server performs bandwidth scheduling to the bandwidth in the next unit time period of the network service, the traffic actually generated in the next unit time period of the network service may be obtained, that is, the foregoing actual traffic, and the actual traffic and the feature data corresponding to the next unit time period are input into the machine learning model as the correction data, so that the machine learning model corrects the model parameter.

For example, it is assumed that the next unit time period is a unit time period b. The server schedules a network bandwidth in the unit time period b of the network service according to the prediction traffic obtained in step 305. After the unit time period b, the server obtains actual traffic in the unit time period b of the network service and inputs the actual traffic in the unit time period b of the network service and feature data (that is, the feature data obtained in step 304) corresponding to the unit time period b into the neural network model as the correction data. The neural network model automatically accomplishes correcting the model parameter. The neural network model performs traffic prediction according to the corrected model parameter when traffic prediction is further needed in the following.

Figure 4:
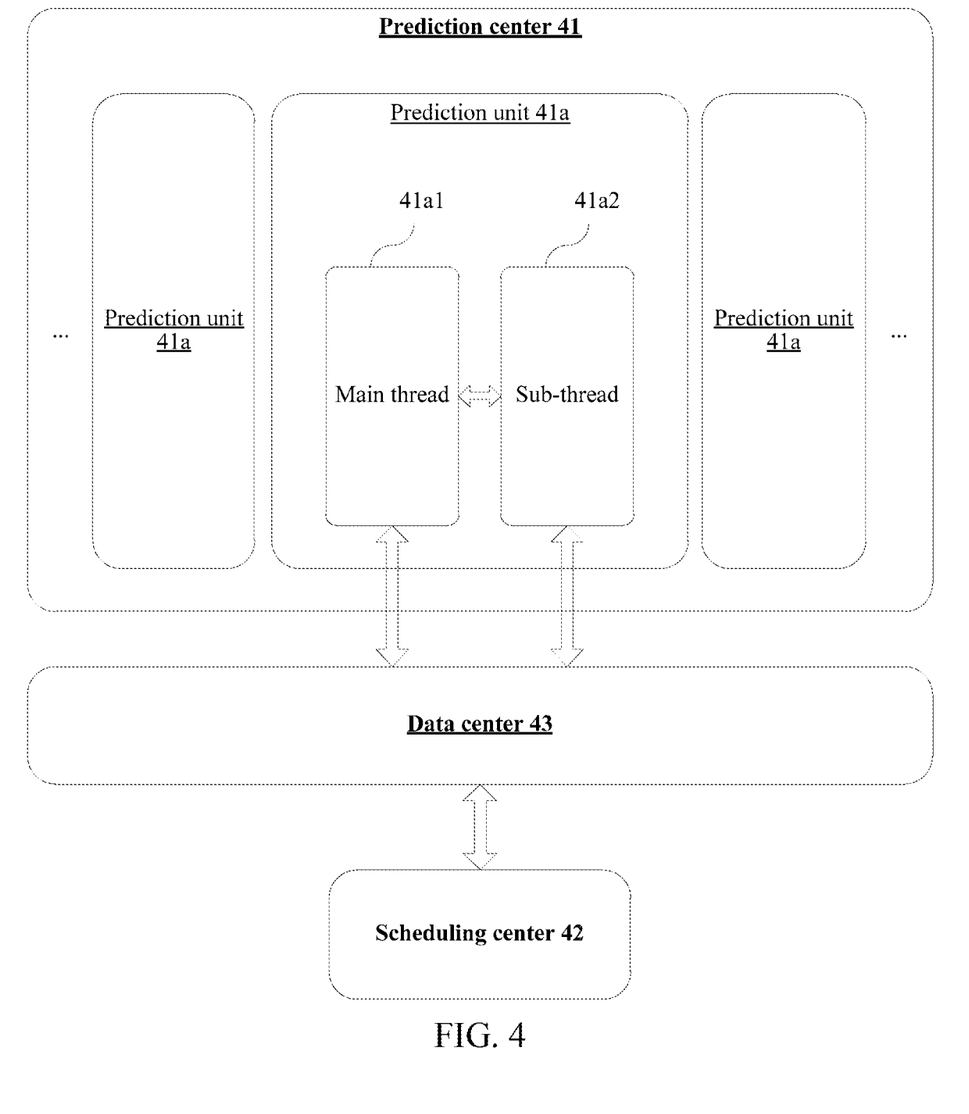
FIG. 4 is a schematic architectural diagram of a server according to the embodiment in FIG. 3.

Specifically, referring to FIG. 4, FIG. 4 is a schematic architectural diagram of a server according to an embodiment of this application. The server 40 may be combined by a prediction center 41, a scheduling center 42, and a data center 43. The prediction center 41 includes several prediction units 41a and each prediction unit 41a corresponds to a network service. Each prediction unit 41a includes a main thread 41a1 and a sub-thread 41a2. The sub-thread 41a2 is responsible for preparing data and the main thread 41a1 is responsible for model training, prediction, and model correction. Historical traffic data of the network service stored in the data center 43 may be reported by each network service node. A software vision in network service nodes with different arrangement times and arrangement batches may be different, leading to that a format of data reported by each network service node may not be same. Therefore, before obtaining feature data of each historical time period, the server first needs to initiate a format of the historical traffic data reported by each network service node as a unified data format. Specifically, the server extracts the historical traffic data of the corresponding network service from the sub-thread 41a2 from the data center, initiates the extracted historical traffic data, and obtains training data according to the initiated historical traffic data. The main thread 41a1 performs neural network model training according to the obtained training data. In the following prediction process, the main thread 41a1 waits for a next prediction time and constantly requests the data center from the sub-thread 41a2 to prepare feature data for next prediction, that is, to obtain feature data corresponding to a next unit time period (it is assumed that the next unit time period is a unit time period c) and perform normalization processing to the feature data. When the prediction time is reached, the main thread 41a1 inputs the normalized feature data into a neural network model to obtain prediction traffic and writes into the data center 43. The scheduling center 42 reads the prediction traffic in the unit time period c corresponding to each network service from the data center 43 and performs bandwidth scheduling to each network service according to the prediction traffic corresponding to each network service. After the unit time period c, actual traffic in the unit time period c corresponding to the network service is obtained from the sub-thread 41a2. The main thread 41a1 inputs the actual traffic and the feature data corresponding to the unit time period c into the neural network model, so that the neural network model performs online learning and corrects a model parameter.

In addition, in a server architecture shown in FIG. 4, the prediction center is combined by several prediction units and each prediction unit corresponds to different network services. A traffic prediction procedure of each network service is performed in parallel and is independent to each other. The traffic prediction procedure of each network service has low calculation complexity, effectively reducing complexity of an algorithm at a server side.

In addition, in this embodiment of this application, the network services are divided according to regions, operators, and service types. When an accident (for example, a natural disaster) happens to a region, resulting that all networks in this region break off, or when an operator system in this region breaks, resulting that an operator network in this region breaks off, a prediction unit of the region that the accident happens in the server or the operator that system breaks in this region cannot normally work, but other prediction units are not affected, thereby improving a disaster redundancy capability of the system.

It is noted that step 307 and step 308 are optional steps and may not be performed in actual implementation.

Based on the above, the network service scheduling method provided in this embodiment of this application includes: obtaining historical traffic data of network services, the historical traffic data including actual traffic of a corresponding network service in each historical unit time period; predicting predicted traffic of the network services in a next unit time period after a current moment according to the historical traffic data of the network services; and performing service scheduling for the network services according to the predicted traffic, that is, predicting the predicted traffic in the next unit time period of the network service according to the actual traffic in each historical unit time period of the network service. Scheduling is performed to the network service according to the predicted traffic, so that when the scheduling is performed to a bandwidth of the network service, scheduling can be pre-performed to to-be-generated traffic in the next unit time period based on the network service, thereby accurately scheduling the bandwidth of the network service and improving a bandwidth using rate and a bandwidth scheduling effect of the network service, thus implementing reasonable use of the bandwidth.

In this case, after scheduling, the model parameter of the machine learning model is corrected according to actual traffic in the nest unit time period and feature data in the nest unit time period, so as to continuously optimize the machine learning model in a process of service scheduling and improve accuracy of actual traffic predicted by the machine learning model, thereby further improving bandwidth use rate and an effect of bandwidth scheduling of the network service.

This embodiment of this application uses that the network services are divided according to regions, operators, and service types and traffic prediction is respectively performed as an example for description. During actual application, single prediction may be performed to each service, and the regions, operators, and service types are respectively input in to the machine learning model as a feature, so that the machine learning model predicts each service.

Figure 5:
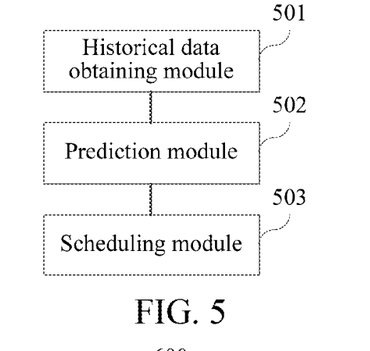
FIG. 5 is a structural block diagram of a network service scheduling apparatus according to an exemplary embodiment.

FIG. 5 is a structural block diagram of a network service scheduling apparatus according to an exemplary embodiment. The network service scheduling apparatus may be implemented as part or all of a server by using hardware or a manner of combining hardware and software, so as to perform all or some steps in the embodiment in FIG. 2 or FIG. 3. The server can perform management scheduling on each managed network service. For example, the server can be a server in a scheduling system of a CDN and is used for performing bandwidth scheduling to each network service in the CDN. The network service scheduling apparatus may include:

a historical data obtaining module 501, configured to obtain historical traffic data of network services, the historical traffic data including actual traffic of a corresponding network service in each historical unit time period;

a prediction module 502, configured to predict predicted traffic of the network services in a next unit time period after a current moment according to the historical traffic data of the network services; and a scheduling module 503, configured to perform service scheduling for the network services according to the predicted traffic.

Optionally, the prediction module includes:

a feature data obtaining submodule, configured to obtain, for each of the network services, feature data corresponding to the next unit time period according to the historical traffic data of the network service; and a prediction submodule, configured to perform prediction according to the feature data corresponding to the next unit time period and a machine learning model with a model parameter, to obtain the predicted traffic of the network service.

Optionally, the machine learning model is a neural network model.

Optionally, the feature data corresponding to the next unit time period includes at least one of the following features:

a time period index of the next unit time period, the time period index being used for indicating that a corresponding unit time period is which unit time period in a day;

a day index of the next unit time period, the day index being used for indicating that a current day of the corresponding unit time period is which day in a week;

corresponding traffic of the network service respectively in X unit time periods latest to the current moment;

actual traffic of the network service in each unit time period corresponding to the time period index of the next unit time period in Y days before the current day;

actual traffic of the network service in each unit time period corresponding to the time period index and the day index of the next unit time period in Z weeks before the current day; and activeness of the network service, where X, Y, and Z are preset positive integers.

Optionally, the apparatus further includes:

a training data obtaining module, configured to, before the prediction submodule performs prediction according to the feature data corresponding to the next unit time period and the machine learning model with the model parameter, to obtain the predicted traffic of the network service, obtain several groups of training data of the network service according to the historical traffic data of the network service, each group of the training data including actual traffic of the network service in a historical unit time period and feature data corresponding to the historical unit time period; and a training module, configured to perform machine training according to the several groups of training data of the network service and the machine learning model, to obtain the model parameter.

Optionally, the apparatus further includes:

a correction data obtaining module, configured to obtain correction data of the network service after the next unit time period, where the correction data includes actual traffic in the next unit time period of the network service and the feature data corresponding to the next unit time period; and a correction module, configured to correct the model parameter according to the correction data.

Optionally, the scheduling module is configured to schedule network bandwidths respectively corresponding to the network services in the next unit time period according to the predicted traffic of the network services.

Optionally, each of the network services corresponds to a region, an operator, and a service type.

Based on the above, the network service scheduling apparatus provided in this embodiment of this application includes: obtaining historical traffic data of network services, the historical traffic data including actual traffic of a corresponding network service in each historical unit time period; predicting predicted traffic of the network services in a next unit time period after a current moment according to the historical traffic data of the network services; and performing service scheduling for the network services according to the predicted traffic, that is, predicting the predicted traffic in the next unit time period of the network service according to the actual traffic in each historical unit time period of the network service. Scheduling is performed to the network service according to the predicted traffic, so that when the scheduling is performed to a bandwidth of the network service, scheduling can be pre-performed to to-be-generated traffic in the next unit time period based on the network service, thereby accurately scheduling the bandwidth of the network service and improving a bandwidth using rate and a bandwidth scheduling effect of the network service, thus implementing reasonable use of the bandwidth.

Figure 6:
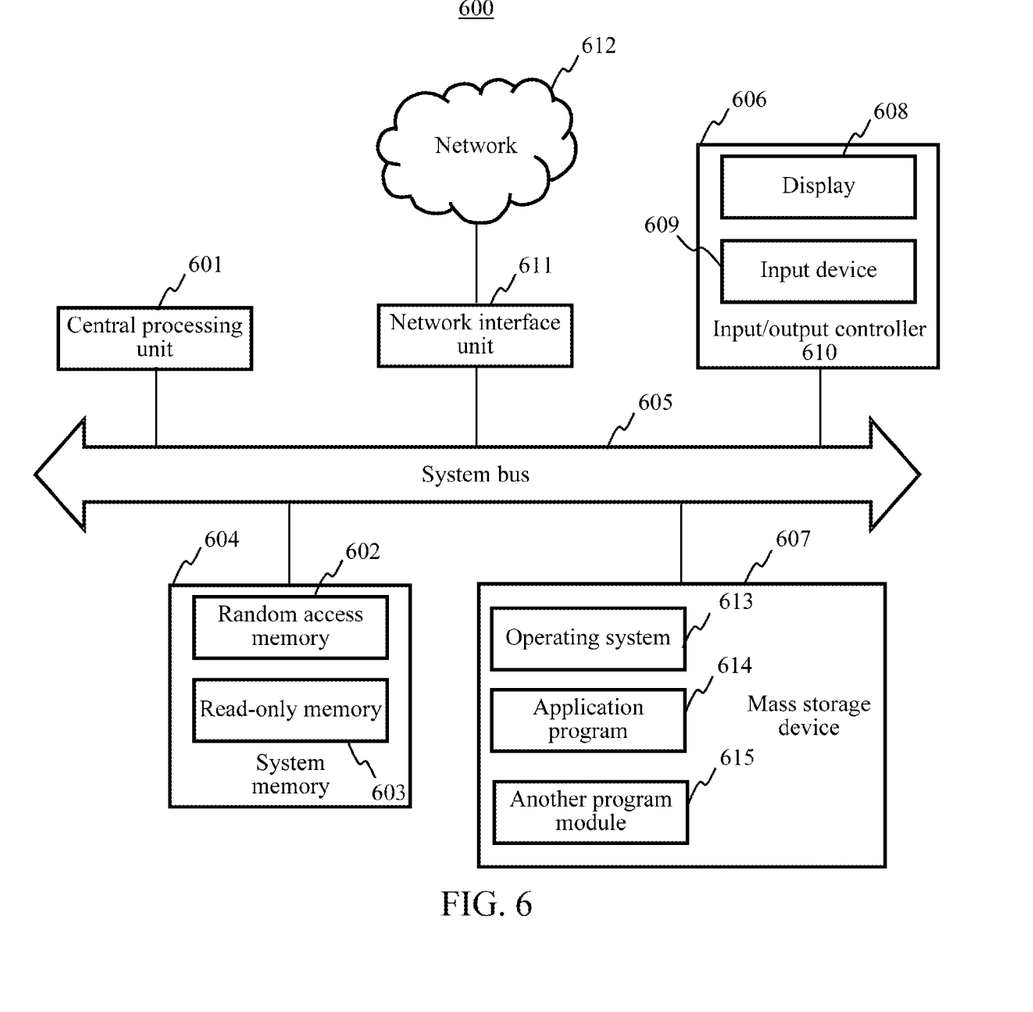
FIG. 6 is a schematic structural diagram of a server according to an exemplary embodiment.

FIG. 6 is a schematic structural diagram of a server according to an exemplary embodiment. The server 600 includes a central processing unit (CPU) 601, a system memory 604 including a random access memory (RAM) 602 and a read-only memory (ROM) 603, and a system bus 605 connecting the system memory 604 and the CPU 601. The server 600 further includes a basic input/output system (I/O system) 606 used for transmitting information between components in a computer, and a mass storage device 607 used for storing an operating system 613, an application program 614, and another program module 615.

The basic I/O system 606 includes a display 608 configured to display information, and an input device 609 configured to input information by a user, such as a mouse and a keyboard. The display 608 and the input device 609 both connect to the CPU 601 by connecting to an input and output controller 610 of the system bus 605. The basic I/O system 606 may further include the input and output controller 610, so as to receive and process input from a plurality of other devices such as a keyboard, a mouse, and an electronic stylus. Similarly, the input and output controller 610 further provides output to a display screen, a printer or another type of output device.

The large-capacity storage device 607 is connected to the CPU 601 by connecting to a large-capacity storage controller (not shown) of the system bus 605. The mass storage device 607 and an associated computer readable medium provide non-volatile storage to the server 600. That is, the large-capacity storage device 607 may include a computer readable medium (not shown) such as a hard disk or a compact disc read-only memory (CD-ROM).

In general, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an erasable programmable read-only memory (EPROM), an electrically erasable programmable read-only memory (EE-PROM), a flash memory or other solid storage technologies, a CD-ROM, a digital video disc (DVD) or other optical storages, a cassette, a magnetic tape, and a disk storage or other magnetic storage devices. Certainly, persons in the art may know that the computer storage medium is not limited to the foregoing. The system memory 604 and the large-capacity storage device 607 may be collectively referred to as a memory.

According to the embodiments of this application, the server 600 may further be connected to a remote computer on a network through a network, such as Internet. That is, the server 600 may be connected to a network 612 by being connected to a network interface unit 611 on the system bus 605, or, may be connected to a network of another type or a remote computer system (not shown) by using the network interface unit 611.

The memory further includes one or more than one programs. The one or more than one programs are stored in the memory. The CPU 601 executes the one or more than one programs to implement the network service scheduling method shown in FIG. 2 or FIG. 3.

In an exemplary embodiment, a non-temporary computer readable storage medium is further provided, the storage medium storing at least an instruction, at least a program, a code word or instruction word, the at least an instruction, the at least a program, the code word or instruction word being loaded and executed by a processor to implement the network service scheduling method shown in the embodiments of this application. For example, the non-transitory computer readable storage medium may be a ROM, a RAM, a CD-ROM, a magnetic tape, a floppy disk, or an optical data storage device.

In an exemplary embodiment, a computer program product is further provided, including instructions used for implementing the network service scheduling method shown in the embodiments of this application. Optionally, the product may include an instruction used for obtaining historical traffic data of network services, the historical traffic data including actual traffic of a corresponding network service in each historical unit time period; an instruction used for predicting predicted traffic of the network services in a next unit time period after a current moment according to the historical traffic data of the network services; and an instruction used for performing service scheduling for the network services according to the predicted traffic.

After considering the specification and implementing the present disclosure, persons skilled in the art can readily think of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It should be understood that this application is not limited to the precise structures described above and shown in the accompanying drawings, and various modifications and changes can be made without departing from the scope of this application. The scope of this application is subject to the appended claims.

What is claimed is:

1. A method for network service scheduling, comprising:
    obtaining, by processing circuitry of an information processing apparatus, historical network traffic data of network services that are provided in a content delivery network (CDN), the historical network traffic data including actual traffic data of the network services in past time units before a present moment;
    predicting, by the processing circuitry, future network traffic of the network services in a next time unit after the present moment according to the historical network traffic data of the network services, wherein the future network traffic is predicted based on a machine learning model that is trained according to multiple groups of training data of the network services, the multiple groups of training data including at least information on service operators, regions, and service types of the network services; and
    scheduling, by the processing circuitry, network resources for the network services according to the predicted future network traffic.

2. The method according to claim 1, further comprising:
    obtaining, for a network service, first feature data of the next time unit according to the historical network traffic data of the network service; and
    predicting, by the processing circuitry, the future network traffic of the network service according to the first feature data of the next time unit and the machine learning model with a model parameter.

3. The method according to claim 2, further comprising at least one of:
- obtaining a time index of the next time unit that is indicative of a specific time duration in a day corresponding to the next time unit, the first feature data of the next time unit for the network service including the time index;
- obtaining a day index of the next time unit that is indicative of a specific day in a week for the next time unit, the first feature data of the next time unit for the network service including the day index;
- obtaining X network traffic measures of the network service respectively in latest X time units, wherein X is a positive integer, and the first feature data of the next time unit for the network service includes the X network traffic measures;
- obtaining Y network traffic measures of the network service respectively for latest Y days, wherein Y is a positive integer, a network traffic measure in the Y network traffic measures for a day in the latest Y days is a traffic measure of the network service in a specific time unit of the day having the same time index as the next time unit, and the first feature data of the next time unit for the network service includes the Y network traffic measures;
- obtaining Z network traffic measures of the network service respectively for latest Z weeks, wherein Z is a positive integer, a network traffic measure in the Z network traffic measures for a week is a traffic measure of the network service in a specific time unit in the week having the same time index and the same day index as the next time unit, and the first feature data of the next time unit for the network service includes the Z network traffic measures; and
- determining an activeness of the network service, the first feature data of the next time unit for the network service including the activeness of the network service.

4. The method according to claim 2, further comprising:
- obtaining, the multiple groups of training data of the network service according to the historical network traffic data of the network service, a group in the multiple groups of training data comprising a network traffic measure of the network service in a past time unit and second feature data of the past time unit; and
- training the machine learning model according to the multiple groups of training data of the network service, to determine the model parameter.

5. The method according to claim 4, further comprising:
- obtaining correction data of the network service after the next time unit and a network traffic measure of the network service in the next time unit is available, wherein the correction data comprises the network traffic measure in the next time unit and the first feature data of the next time unit; and
- correcting the model parameter of the machine learning model according to the correction data.

6. The method according to claim 1, further comprising:
- scheduling network bandwidths respectively to the network services in the next time unit according to the predicted future network traffic of the network services.

7. The method according to claim 2, further comprising:
- training the machine learning model according to the historical network traffic data of the network services to determine the model parameter;
- predicting the future network traffic of the network services according to the machine learning model; and
- scheduling network bandwidths respectively to the network services according to the predicted future network traffic of the network services.

8. An apparatus, comprising:
- interface circuitry configured to receive, from devices that provide network services in a content delivery network (CDN), network traffic measures of the network services; and
- processing circuitry configured to:
  - obtain historical network traffic data of the network services, the historical network traffic data including actual traffic data of the network services in past time units before a present moment;
  - predict future network traffic of the network services in a next time unit after the present moment according to the historical network traffic data of the network services, wherein the future network traffic is predicted based on a machine learning model that is trained according to multiple groups of training data of the network services, the multiple groups of training data including at least information on service operators, regions, and service types of the network services; and
  - schedule network resources for the network services according to the predicted future network traffic.

9. The apparatus according to claim 8, wherein the processing circuitry is configured to:
- obtain, for a network service, first feature data of the next time unit according to the historical network traffic data of the network service; and
- predict the future network traffic of the network service according to the first feature data of the next time unit and the machine learning model with a model parameter.

10. The apparatus according to claim 9, wherein the processing circuitry is configured to obtain the first feature data that comprises at least one of:
- a time index of the next time unit that is indicative of a specific time duration in a day corresponding to the next time unit;
- a day index of the next time unit that is indicative of a specific day in a week for the next time unit;
- X network traffic measures of the network service respectively in latest X time units, wherein X is a positive integer;
- Y network traffic measures of the network service respectively for latest Y days, wherein Y is a positive integer, a network traffic measure in the Y network traffic measures for a day in the latest Y days is a traffic measure of the network service in a specific time unit of the day having the same time index as the next time unit;
- Z network traffic measures of the network service respectively for latest Z weeks, wherein Z is a positive integer, a network traffic measure in the Z network traffic measures for a week is a traffic measure of the network service in a specific time unit in the week having the same time index and the same day index as the next time unit; and
- an activeness of the network service.

11. The apparatus according to claim 9, wherein the processing circuitry is configured to:
- obtain, the multiple groups of training data of the network service according to the historical network traffic data of the network service, a group in the multiple groups of training data comprising a network traffic measure of the network service in a past time unit and second feature data of the past time unit; and train the machine learning model according to the multiple groups of training data of the network service, to determine the model parameter.

12. The apparatus according to claim 11, wherein the processing circuitry is configured to:

obtain correction data of the network service after the next time unit passes and a network traffic measure in the next time unit is available, wherein the correction data comprises the network traffic measure in the next time unit and the first feature data of the next time unit; and correct the model parameter of the machine learning model according to the correction data.

13. The apparatus according to claim 8, wherein the processing circuitry is configured to:

schedule network bandwidths respectively to the network services in the next time unit according to the predicted future network traffic of the network services.

14. The apparatus according to claim 9, wherein the processing circuitry is configured to:

train the machine learning model according to the historical network traffic data of the network services to determine the model parameter;

predict the future network traffic of the network services according to the machine learning model; and schedule network bandwidths respectively to the network services according to the predicted future network traffic of the network services.

15. A non-transitory computer-readable medium storing instructions which when executed by a computer cause the computer to perform:

obtaining historical network traffic data of network services that are provided in a content delivery network (CDN), the historical network traffic data including actual traffic data of the network services in past time units before a present moment;

predicting future network traffic of the network services in a next time unit after the present moment according to the historical network traffic data of the network services, wherein the future network traffic is predicted based on a machine learning model that is trained according to multiple groups of training data of the network services, the multiple groups of training data including at least information on service operators, regions, and service types of the network services; and scheduling network resources for the network services according to the predicted future network traffic.

16. The non-transitory computer-readable medium according to claim 15, wherein the instructions cause the computer to further perform:

obtaining, for a network service, first feature data of the next time unit according to the historical network traffic data of the network service; and predicting the future network traffic of the network service according to the first feature data of the next time unit and the machine learning model with a model parameter.

17. The non-transitory computer-readable medium according to claim 16, wherein the instructions cause the computer to further perform at least one of:

obtaining a time index of the next time unit that is indicative of a specific time duration in a day corresponding to the next time unit, the first feature data of the next time unit for the network service including the time index;

obtaining a day index of the next time unit that is indicative of a specific day in a week for the next time unit, the first feature data of the next time unit for the network service including the day index;

obtaining X network traffic measures of the network service respectively in latest X time units, wherein X is a positive integer, and the first feature data of the next time unit for the network service includes the X network traffic measures;

obtaining Y network traffic measures of the network service respectively for latest Y days, wherein Y is a positive integer, a network traffic measure in the Y network traffic measures for a day in the latest Y days is a traffic measure of the network service in a specific time unit of the day having the same time index as the next time unit, and the first feature data of the next time unit for the network service includes the Y network traffic measures;

obtaining Z network traffic measures of the network service respectively for latest Z weeks, wherein Z is a positive integer, a network traffic measure in the Z network traffic measures for a week is a traffic measure of the network service in a specific time unit in the week having the same time index and the same day index as the next time unit, and the first feature data of the next time unit for the network service includes the Z network traffic measures; and determining an activeness of the network service, the first feature data of the next time unit for the network service including the activeness of the network service.

18. The non-transitory computer-readable medium according to claim 16, wherein the instructions cause the computer to further perform:

obtaining, the multiple groups of training data of the network service according to the historical network traffic data of the network service, a group in the multiple groups of training data comprising a network traffic measure of the network service in a past time unit and second feature data of the past time unit; and training the machine learning model according to the multiple groups of training data of the network service, to determine the model parameter.

19. The non-transitory computer-readable medium according to claim 18, wherein the instructions cause the computer to further perform:

obtaining correction data of the network service after the next time unit passes and a network traffic measure in the next time unit is available, wherein the correction data comprises the network traffic measure in the next time unit and the first feature data of the next time unit; and correcting the model parameter of the machine learning model according to the correction data.

20. The non-transitory computer-readable medium according to claim 15, wherein the instructions cause the computer to further perform:

scheduling network bandwidths respectively to the network services in the next time unit according to the predicted future network traffic of the network services.

* * * * *